(12) United States Patent
Ueda

(10) Patent No.: US 7,243,250 B2
(45) Date of Patent: Jul. 10, 2007

(54) ELECTRONIC APPARATUS AND METHOD FOR CONTROLLING SEMICONDUCTOR INTEGRATED CIRCUIT

(75) Inventor: Tomohiro Ueda, Tokyo (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 10/822,838

(22) Filed: Apr. 13, 2004

(65) Prior Publication Data

US 2004/0210781 A1    Oct. 21, 2004

(30) Foreign Application Priority Data

Apr. 17, 2003   (JP)   ............................. 2003-112325

(51) Int. Cl.
*G06F 1/00*    (2006.01)
*G11C 5/14*    (2006.01)
(52) U.S. Cl. .................. 713/323; 713/324; 365/229
(58) Field of Classification Search ............... 713/323, 713/300, 320, 322; 712/228; 365/229
See application file for complete search history.

(56) References Cited

U.S. PATENT DOCUMENTS 6,578,137 B2 *   6/2003   Parady .................. 712/228
6,664,148 B2 *   12/2003  Goto et al. ............. 438/151
6,879,196 B2 *   4/2005   Lutkemeyer ............ 327/161
6,914,845 B2 *   7/2005   Ooishi ................... 365/229

FOREIGN PATENT DOCUMENTS

JP    10333881 A    * 12/1998

* cited by examiner

*Primary Examiner*—Thomas Lee
*Assistant Examiner*—Suresh K Suryawanshi
(74) *Attorney, Agent, or Firm*—Oblon, Spivak, McClelland, Maier & Neustadt, P.C.

(57) ABSTRACT

When an event takes place in a standby mode, data corresponding to the event is set to a shadow register. The shadow register is operated with a low speed local clock. The contents of the shadow register are copied to a bus IF register through a selector. The bus IF register is connected to a main circuit through a system LSI bus. Data is read from/written to the bus IF register in synchronization with a high speed clock. When the status of the bus IF register changes, a CPU is notified of an interrupt. In a normal mode, an event corresponding to a status change is set to the data bus IF register not through the shadow register. In the standby mode, power of the main circuit is turned off. The high speed clock for the bus IF register is stopped. Thus, the power consumption can be reduced.

8 Claims, 6 Drawing Sheets

ELECTRONIC APPARATUS AND METHOD FOR CONTROLLING SEMICONDUCTOR INTEGRATED CIRCUIT

BACKGROUND OF THE INVENTION

1. Field of the Invention

The present invention relates to an electronic apparatus driven by for example a battery power source and to a method for controlling a semiconductor integrated circuit, in particular, to a structure and a method for reducing power consumption.

2. Description of the Related Art

Portable electronic apparatuses such as a cellular phone, a personal digital assistant (PDA), and a portable computer normally use a battery as a power source. A battery driven type system comprises a system large scale integrated circuit (system LSI), a battery, and a power controlling integrated circuit (power controlling IC). A system LSI is an LSI chip that has a central processing unit (CPU), a memory, and various peripheral function blocks. Recently, portable electronic apparatuses are also provided with multimedia communication and process functions as well as a communication function. Miniaturized system LSIs having a gate length of for example as narrow as 0.3 µm have been accomplished.

In the battery driven type portable electronic apparatuses such as a cellular phone, their standby time depends on their power consumption. Thus, it is important for these apparatuses to reduce their power consumption. A first related art reference discloses a technology of which the voltage drop of a power source is controlled, while power for a system LSI is always turned on, a clock supplied to an internal circuit such as a CPU is stopped so that power consumption in a standby state is reduced.

FIRST RELATED ART REFERENCE

Japanese Patent Laid-Open Publication No. 2002-170933

In the method disclosed in the first related art reference, in the standby state, a clock is not supplied to unnecessary circuits such as a CPU. However, since a clock for a system bus is operated, a standby current becomes large. Thus, in the standby state, the power consumption becomes large. The clock for the system bus is supplied to circuits that are necessary in the standby state. When an event for example a key operation takes place in an external operating portion, it is necessary to activate the apparatus that is in the standby state (hereinafter this operation is sometimes referred to as wakeup). Thus, the clock cannot be stopped for a register that receives an event from a peripheral device and holds the type of an event. If the clock for the register that holds the type of an event were stopped, data could not be written to the register. As a result, since the CPU would not determine the cause of the wakeup, it could not normally wake up the apparatus.

OBJECTS AND SUMMARY OF THE INVENTION

Therefore, it is needed to provide an electronic apparatus and a method for controlling a semiconductor integrated circuit that cause a system bus clock for a register that holds information of an event to be stopped so as to reduce power consumption in a standby state.

A first aspect of the present invention is an electronic apparatus having a semiconductor integrated circuit having a first circuit and a second circuit, each of the first circuit and the second circuit having a normal operation state and a standby state, the electronic apparatus comprising a power controlling portion for supplying power to the first circuit and the second circuit in the normal operation state and for supplying power to only the first circuit in the standby state; a clock controlling portion for controlling generation of a first clock and a second clock so as to generate the first clock and the second clock in the normal operation state and only the first clock in the standby state; a first register that is disposed in the first circuit and operated with the first clock; a second register that is disposed in the first circuit and operated with the second clock; and a controlling portion for copying contents that are set to the first register to the second register when the state changes from the standby state to the normal operation state.

A second aspect of the present invention is a method for controlling a semiconductor integrated circuit having a first circuit and a second circuit, each of the first circuit and the second circuit has a normal operation state and a standby state, the method comprising the steps of controlling power supplied to the first circuit and the second circuit so as to supply the power to the first circuit and the second circuit in the normal operation state and the power to only the first circuit in the standby state; controlling generation of a first clock and a second clock so as to generate the first clock and the second clock in the normal operation state and to generate only the first clock in the standby state; and copying contents that are set in the first register that is disposed in the first circuit and operated with the first clock to a second register that is disposed in the first circuit and operated with the second clock when the state changes from the standby state to the normal operation state.

Since the power controlling portion turns off the power of the main circuit that occupies a large area of the integrated circuit in the standby state, a sub threshold current in the standby state can be reduced. As a result, the power consumption in the standby state can be reduced. In the standby state, since a state stored in the first register is copied to the second register, the second clock for a register from which data is read by the CPU can be stopped. As a result, the power consumption can be further reduced.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Next, with reference to the accompanying drawings, an embodiment of the present invention will be described. FIG.

Figure 1:
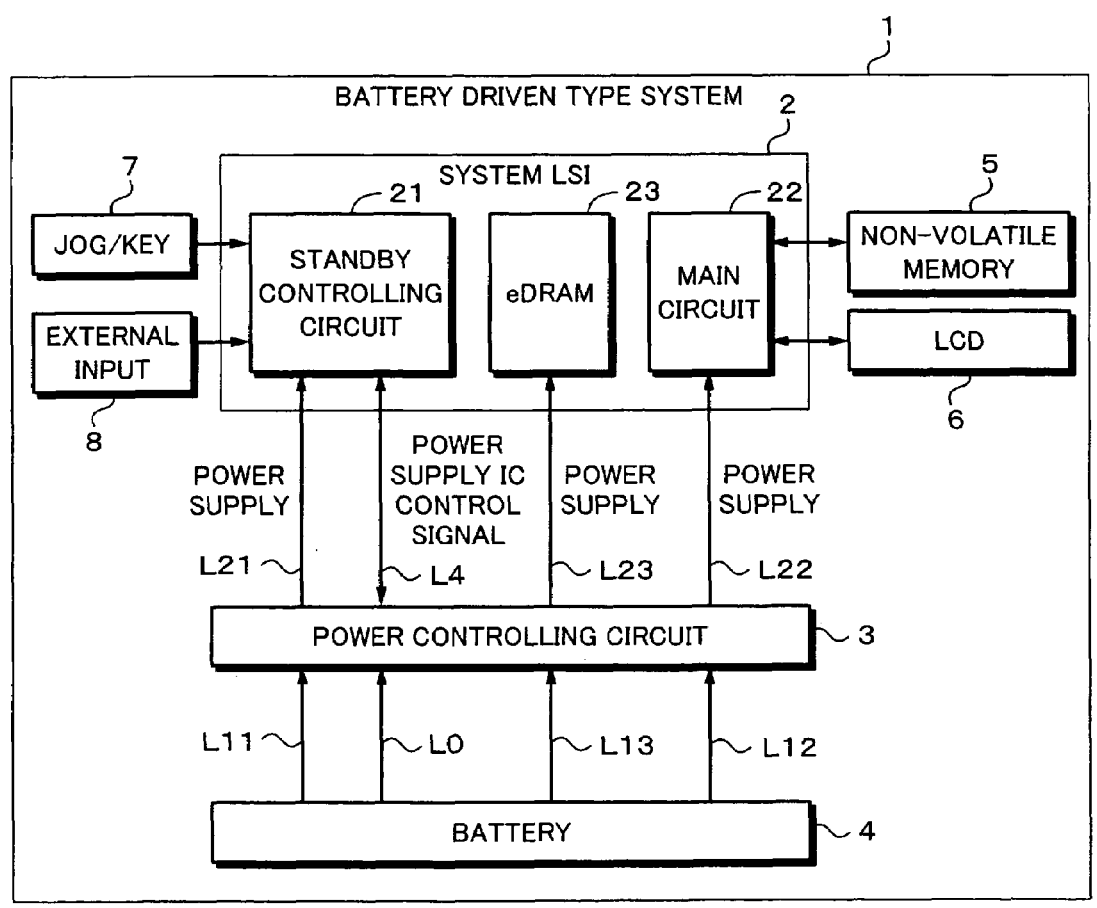
FIG. 1 is a block diagram showing an overall structure of a battery driven type system according to an embodiment of the present invention.

1 shows an overall structure of the embodiment. In FIG. 1, reference numeral 1 represents an entire battery driven type system such as a PDA or a cellular phone. Reference numeral 2 represents a system LSI that controls the system 1. The system LSI 2 is for example a MOS LSI. Reference numeral 3 represents a power controlling circuit that has a regulator that supplies power to the system LSI 2. Reference numeral 4 represents a battery.

The system LSI 2 has a standby controlling circuit 21 as a first circuit, a main circuit 22 as a second circuit, and an embedded dynamic random access memory (eDRAM) 23. Power is supplied from the power controlling circuit 3 to each circuit block of the system LSI 2 through three independent power lines L21, L22, and L23.

A power line L11 connected from the battery 4 to the power controlling circuit 3 is a power supply line for the standby controlling circuit 21. A regulator is connected to the power controlling circuit 3 between the power line L11 and the power line L21. A power line L12 is a power supply line for the main circuit 22. A regulator is connected to the power controlling circuit 3 between the power line L12 and the power line L22. A power line L13 is a power supply line for the eDRAM 23. A regulator is connected to the power controlling circuit 3 between the power line L13 and the power line L23. A power supply line L0 is connected from the battery 4 to a controlling circuit of the power controlling circuit 3. The regulators disposed in the power controlling circuit 3 regulate an output voltage of the battery 4 and output regulated voltages in predetermined levels suitable for the individual circuit portions.

The standby controlling circuit 21 is a block to which power is always supplied from the power controlling circuit 3. The main circuit 22 is a block whose power is turned off in a standby state (hereinafter referred to as standby mode). Only when the eDRAM 23 is used to back up data, power is supplied to the eDRAM 23. When power supplied to the eDRAM 23 is turned off in the standby mode, power is supplied from the power controlling circuit 3 to only the standby controlling circuit 21 of the system LSI 2.

Power supplied to each circuit block of the system LSI 2 is controlled with a control signal generated by a regular controlling circuit of the power controlling circuit 3. Power of the power line L22 and the power line L23 is turned on and off in accordance with the control signal. In addition, a power IC control signal is sent from the standby controlling circuit 21 to the power controlling circuit 3 through a line L4.

In FIG. 1, reference numeral 5 represents a non-volatile memory that is disposed in the system 1. The non-volatile memory 5 stores a program. Reference numeral 6 represents a liquid crystal display (LCD) as a displaying portion. Reference numeral 7 represents an operating portion such as a key pad that the user operates. Reference numeral 8 represents an external input. The external input 8 has a plurality of I/O ports. The main circuit 22 has a central processing unit (CPU).

In the battery driven type system 1, when there is no task that the CPU processes on the program, the mode of the system 1 changes from the normal operation state (hereinafter referred to as normal mode) to the standby mode. When an operation input takes place in the operating portion 7 or an input takes place in the external input 8, the standby controlling circuit 21 performs a process necessary for waking up the system 1 and supplies a power IC control signal that causes power to be supplied to the main circuit 22 and the data backup eDRAM 23 to the power controlling circuit 3 through the line L4. When power is supplied to the main circuit 22 through the power line L22, the main circuit 22 reads a program from the non-volatile memory 5 and initializes the system 1.

Figure 2:
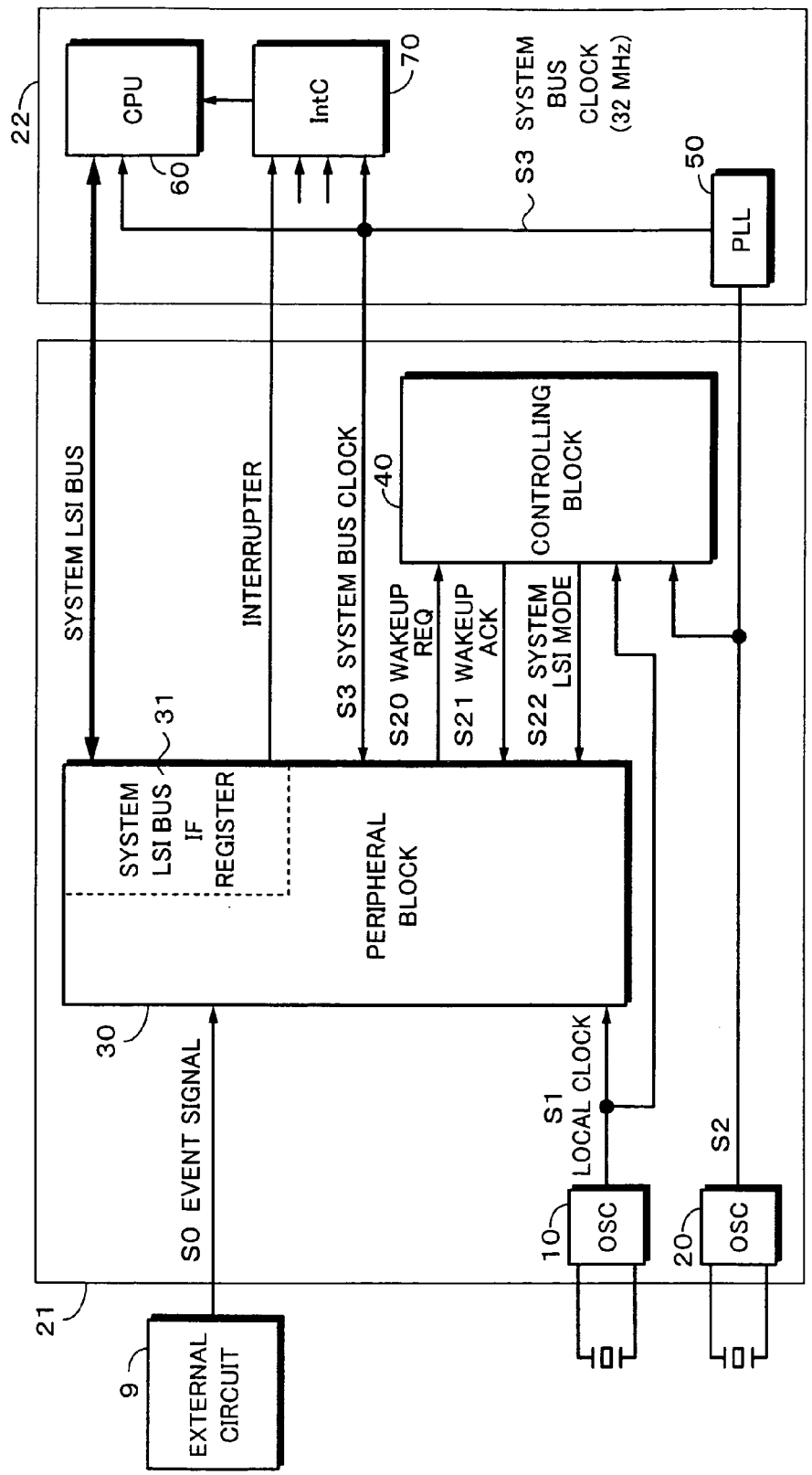
FIG. 2 is a block diagram showing a structure of the embodiment of the present invention.

FIG. 2 shows outlined structures of the standby controlling circuit 21 and the main circuit 22 of the system LSI 2 according to the embodiment shown in FIG. 1. In reality, the circuit scale of the main circuit 22 is much larger than that of the standby controlling circuit 21. FIG. 2 shows only a part of the main circuit 22 that relates to only the feature of the present invention. In FIG. 2, structures of the eDRAM 23 and the power control are omitted.

The standby controlling circuit 21 is mainly divided into two portions that are a peripheral block 30 and a controlling block 40. The peripheral block 30 functions as an interface that processes an event signal s0 received from an external circuit 9 disposed outside the system LSI 2.

In FIG. 2, the foregoing operating portion 7 and external input 8 are included in the external circuit 9. A system LSI bus (having a predetermined bit length) is disposed between a system LSI bus interface register (hereinafter referred to as bus IF register) 31 as a second register of the peripheral block 30 and a CPU 60 of the main circuit 22. In the normal mode in which the CPU 60 is executing the program, the peripheral block 30 operates as a peripheral circuit of the CPU 60.

The external circuit 9 is for example an input device. Examples of the input device are a JOG/KEY interface, a general purpose input output (GPIO) port, a real time clock circuit, a serial parallel interface (SPI), a universal asynchronous receiver-transmitter (UART) circuit, a touch panel, a wireless interface, a universal serial bus (USB), and so forth. The JOG is an input device that has a roller that can be rotated and pushed. The JOG generates a signal that represents that the roller is rotated and signals that represent the direction and amount of rotation of the roller. The KEY generates a signal that represents that a key is pressed and information that represents the type of a key that is operated. The touch panel generates a signal that represents that the panel is touched and coordinate data. The external circuit 9 supplies the event signal s0 that corresponds to the operation of the input device to the standby controlling circuit 21.

The standby controlling circuit 21 has clock oscillators 10 and 20. The clock oscillator 10 generates a first clock s1 of for example 32.768 kHz (this clock is referred to as local clock). The clock oscillator 20 generates a system clock s2 of for example 7.68 MHz. The clock oscillator 10, which generates the local clock s1 whose frequency is relatively low, always oscillates in any of the standby mode and the normal mode. The clock oscillator 10 supplies the local clock s1 to the peripheral block 30 and the controlling block 40, which controls the system LSI 2, of the standby controlling circuit 21.

The clock oscillator 20 supplies the system clock s2 to a phase locked loop (PLL) 50 of the main circuit 22. The PLL 50 multiplies the frequency of the system clock s2 supplied from the clock oscillator 20 and outputs a second clock s3 (referred to as system bus clock) having frequency of 32 MHz that is higher than the local clock s1. The system bus clock s3 is necessary for the operation of the system LSI 2. The system bus clock s3 is a clock for the system LSI bus. The system bus clock s3 is supplied to the main circuit 22 and the peripheral block 30. The controlling block 40 controls a clock so as to disable the PLL 50 in the standby mode and thereby stop generating the system bus clock s3. When power for the main circuit 22 is turned on, the controlling block 40 controls a clock so as to enable the PLL 50. The system bus clock s3 is supplied to each circuit block of the main circuit 22 and to the peripheral block 30 of the standby controlling circuit 21. In the standby mode, when the system clock s2 is not necessary, by controlling on/off state of the clock oscillator 20, the generation of the system bus clock s3 may be controlled.

Both the local clock s1 and the system bus clock s3 are supplied to the peripheral block 30. The bus IF register 31 from and to which the CPU 60 reads and writes data through the system LSI bus is operated with the system bus clock s3. The other circuits (functions) of the peripheral block 30 are operated with the local clock s1.

The controlling block 40 is operated with the local clock s1. The controlling block 40 performs a power control, a reset control, and a clock control for the system LSI 2 and manages the states of the standby mode and normal mode of the system 1. For simplicity, a part of routes of the control signal is omitted in FIG. 2. The structure relating to the eDRAM 23 is operated with the system clock s2.

A wakeup request s20 is supplied from the peripheral block 30 to the controlling block 40. A wakeup acknowledge (ACK) s21 is sent from the controlling block 40. The wakeup ACK s21 represents that the controlling block 40 has accepted the wakeup request. In addition, a system LSI mode signal s22 is supplied from the controlling block 40 to the peripheral block 30.

The controlling block 40 controls the PLL 50. The controlling block 40 disables the PLL 50 when the system 1 is in the standby mode. When data is not backed up to the eDRAM 23 in the standby mode, the controlling block 40 controls a clock so as to stop the clock oscillator 20. When the mode of the system LSI 2 changes to the standby mode, the controlling block 40 turns off the power of the main circuit 22.

While the system LSI 2 is in the standby mode, when the wakeup request takes place in the peripheral block 30, the controlling block 40 controls a sequence of operations. For example, the controlling block 40 turns on the power of the main circuit 22, resets the main circuit 22 is reset, turns on the PLL 50, and turns on the system bus clock s3 of the system LSI 2. When power is supplied to the main circuit 22, the controlling block 40 resets the main circuit 22. When a new battery is attached to the system 1, the controlling block 40 resets the main circuit 22, the peripheral block 30 of the standby controlling circuit 21, and the controlling circuit and so forth of the controlling block 40.

The bus IF register 31 has a plurality of registers from and to which the CPU 60 can read and write data. One of the registers is a register that holds data that represents that a status changes due to occurrence of an event. The register has a predetermined bit length. In the standby mode, although power is not turned off, since the system bus clock s3 is turned off, data cannot be read from and written to the register. Thus, as will be described later, according to the present embodiment, a shadow register is disposed. Data can be read and written from and to the shadow register with the low speed local clock. When the system 1 is woken up, the contents of the shadow register are copied to the register (referred to as bus IF register).

The main circuit 22 comprises the PLL 50, the CPU 60, and an interrupt controlling circuit 70. The main circuit 22 has many circuits such as a controlling circuit for the LCD 6. However, for simplicity, illustration and description of circuit blocks that do not relate to the feature of the present invention are omitted. The CPU 60 executes the program stored in the non-volatile memory 5. The CPU 60 performs processes for displaying data on the LCD 6, for inputting data from the operating portion 7, and for inputting data from the external input 8. When the CPU 60 receives an interrupt from the interrupt controlling circuit 70, the CPU 60 performs an interrupting process corresponding thereto. Besides the bus IF register 31, the non-volatile memory 5, the LCD 6, the eDRAM 23, the interrupt controlling circuit 70, and so forth are connected to the system LSI bus connected to the CPU 60.

In the normal mode, the bus IF register 31 of the peripheral block 30 is operated with the high frequency system bus clock s3. The CPU 60 performs a reading/writing operation for the bus IF register 31. Thus, the system 1 can be operated at high speed. An interrupt signal is supplied from the bus IF register 31 to the interrupt controlling circuit 70 of the main circuit 22. The CPU 60 is notified of the interrupt.

In the standby mode, in which the system bus clock s3 is stopped, circuits other than the bus IF register 31 of the standby controlling circuit 21 can be operated. When a wakeup event such as a key operation takes place in the standby mode, the wakeup request s20 is supplied from the peripheral block 30 to the controlling block 40.

The controlling block 40 controls the power controlling circuit so as to supply the power IC control signal to the power controlling circuit 3 and thereby supply power to the main circuit 22. Thereafter, the controlling block 40 causes the clock oscillator 20 to oscillate and thereby enables the PLL 50. When the system bus clock s3 becomes stable, the controlling block 40 supplies the wakeup ACK to the peripheral block 30.

Figure 3:
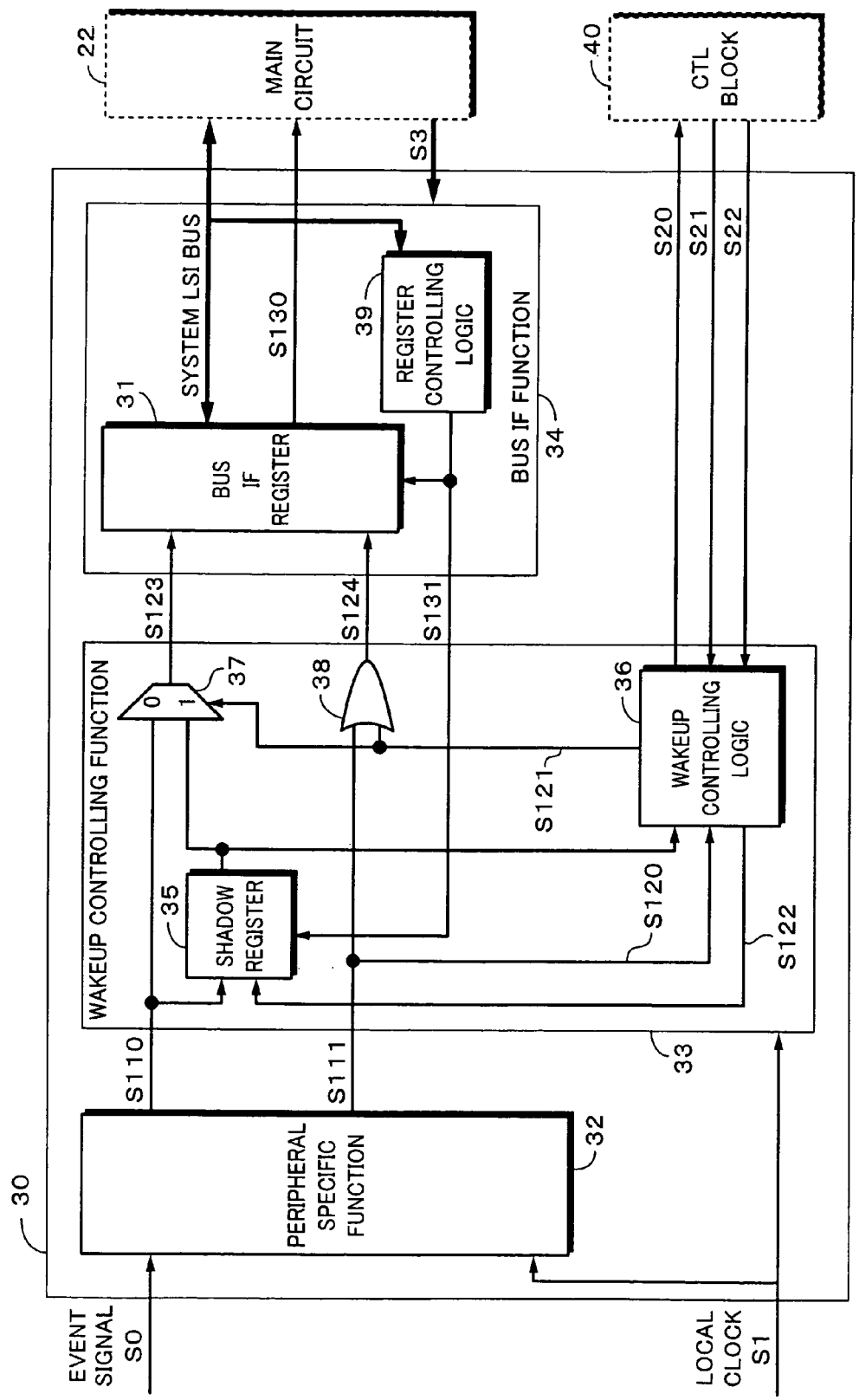
FIG. 3 is a block diagram showing a detailed structure of the embodiment of the present invention.

Next, with reference to FIG. 3, the peripheral block 30 will be described in detail. The peripheral block 30 is composed of a peripheral specific function 32, a wakeup controlling function 33, and an LSI bus interface function (referred to as LSI bus IF function) 34.

The peripheral specific function 32 is a dedicated circuit structure for the external circuit 9 so as to receive the event signal s0 from the external circuit 9. The peripheral specific function 32 is operated with the local clock s1. The peripheral specific function 32 outputs a register set data s110 and a register update signal s111 that defines a timing at which the register set data s110 is fetched.

The wakeup controlling function 33 structures a controlling portion. When the mode of the system 1 changes from the standby mode to the normal mode, the controlling portion copies the contents that have been set to a shadow register 35 to the bus IF register 31. The wakeup controlling function 33 is operated with the local clock s1. The wakeup controlling function 33 is composed of the shadow register 35 as a first register, a wakeup controlling logic 36, a selector 37, and an OR gate 38. The register set data s110 is supplied from the peripheral specific function 32 to first inputs of the shadow register 35 and the selector 37. The register update signal s111 is supplied form the peripheral specific function 32 to one input of the OR gate 38. The register update signal s111 is supplied as a shadow register state s120 to the wakeup controlling logic 36. When an event takes place in the standby mode, data in accordance with the event is set to the shadow register 35.

When an event takes place in the standby mode, the wakeup controlling logic 36 sends the wakeup request s20 to the controlling block 40. When the system LSI 2 is started up, the wakeup controlling logic 36 receives the wakeup ACK s21 from the controlling block 40 and causes a register wakeup state s121 to be active (logic 1).

When the register wakeup state s121 is active, the contents of the shadow register 35 are supplied as data s123 to the bus IF register 31 through the selector 37. In other words, the contents of the shadow register 35 are copied to the bus IF register 31. Since a data path from the shadow register 35 to the selector 37 to the bus IF register 31 is a parallel bus having a plurality of bits, the copy operation is completed in one clock period of the local clock s1. When the system LSI 2 is in the standby mode, the contents of the shadow register 35 can be updated with the system LSI mode signal s22 received from the controlling block 40.

A shadow register update signal S122 is supplied from the wakeup controlling logic 36 to the shadow register 35. The register set data s110 is set to the shadow register 35 in synchronization with a timing of the shadow register update signal S122. Output data of the shadow register 35 is supplied to the other input of the selector 37. When the peripheral specific function 32 is notified that occurrence of an event took place with the event signal s0 while the system LSI 2 is in the standby mode, the register set data s110 is stored in the shadow register 35 with the shadow register update signal S122. In addition, the shadow register 35 can be cleared along with the bus IF register 31.

The selector 37 is controlled with the register wakeup update signal s121 received from the wakeup controlling logic 36. The register set data s123 selected by the selector 37 is supplied to the bus IF register 31. The register wakeup update signal s121 is supplied to the other input of the OR gate 38. A register update signal s124 takes place at an output of the OR gate 38.

The register set data s123 and the register update signal s124 are input to the bus IF register 31 of the LSI bus IF function 34. The register set data s123 is set to the bus IF register 31 at a timing of the register update signal s124. The bus IF register 31 is connected to the main circuit 22 through the system LSI bus. The bus IF register 31 performs a reading/writing operation in synchronization with the system bus clock s3. When the status of the bus IF register 31 changes, an interrupt controlling circuit of the main circuit 22 is notified of an interrupt with the interrupt control signal s130. A register controlling logic 39 is connected to the system LSI bus. The CPU 60 of the main circuit 22 generates a register clear signal s131 that causes the bus IF register 31 and the shadow register 35 to be cleared.

An operation of the structure shown in FIG. 3 in the normal mode will be described. When an event takes place in the external circuit 9, the peripheral specific function 32 is notified that the event took place with the event signal s0.

The register set data s110 that corresponds to the status change due to occurrence of the event is supplied to the selector 37. In addition, the register update signal s111 is supplied to the OR gate 38. The output data s123 of the selector 37 is set to the bus IF register 31 at a timing of the register update signal s124 received from the OR gate 38.

When the status changes, the LSI bus IF function 34 notifies the interrupt controlling circuit 70 and the CPU 60 of the main circuit 22 that an interrupt took place with the interrupt control signal s130. When the CPU 60 detects an interrupt, the CPU 60 reads data from the bus IF register 31 through the system LSI bus, stores the data to the main memory, and issues a register clear command. The register clear command is supplied to the register controlling logic 39 through the system LSI bus. The register controlling logic 39 generates the register clear signal s131 for the bus IF register 31 and the shadow register 35. When the next event takes place in the normal mode, an operation similar to the foregoing operation is repeatedly performed.

Next, an operation in the case that an event takes place in the standby mode will be described. When an event takes place in the external circuit 9, the peripheral specific function 32 is notified that the event took place with the event signal s0. Data corresponding to a status change due to occurrence of the event is set to the shadow register 35. However, only when the system LSI 2 is in the standby mode, the register update signal s111 received from the peripheral specific function 32 is affected by the shadow register update signal S122.

Data that is set to the shadow register 35 is selected as the register set data s123 by the selector 37 and supplied to the bus IF register 31. Information that is set to the shadow register 35 is input to the wakeup controlling logic 36. The controlling block 40 is notified of the information as the wakeup request s20. When the controlling block 40 is notified of the information, the controlling block 40 turns on the power of the main circuit 22, resets the main circuit 22, starts supplying the system bus clock s3, and cancels the reset state of the main circuit 22 after a predetermined time period elapses.

Immediately after the system bus clock s3 has been supplied, the controlling block 40 returns the wakeup ACK s21 to the wakeup controlling logic 36. As a result, the wakeup controlling logic 36 is notified that the system bus clock s3 has been supplied.

The wakeup controlling logic 36 copies the contents of the shadow register 35 to the bus IF register 31 with the register wakeup update signal s121. The copy operation is completed in one clock period of the local clock s1.

When the contents of the shadow register 35 are copied to the bus IF register 31, the interrupt control signal s130 is supplied to the interrupt controlling circuit 70 of the main circuit 22. As a result, the CPU 60 is notified of the interrupt. When the CPU 60 detects the interrupt, the CPU 60 reads the contents of the bus IF register 31 through the system LSI bus and stores them to the main memory. In addition, the CPU 60 issues the clear command to the register controlling logic 39 through the system LSI bus, causes the register controlling logic 39 to generate the register clear signal s131, and causes the contents of the bus IF register 31 to be cleared with the register clear signal s131.

The sequence of operations for causing the bus IF register 31 to notify the main circuit 22 of an interrupt, reading the contents of the bus IF register 31, and causing the clear command to generate the clear signal is the same as that of the foregoing normal mode. Thus, when the mode of the system LSI 2 changes from the standby mode to the normal mode, the same hardware and process as the normal mode are used. As a result, the sequence of operations can be performed without difference.

Figure 4:
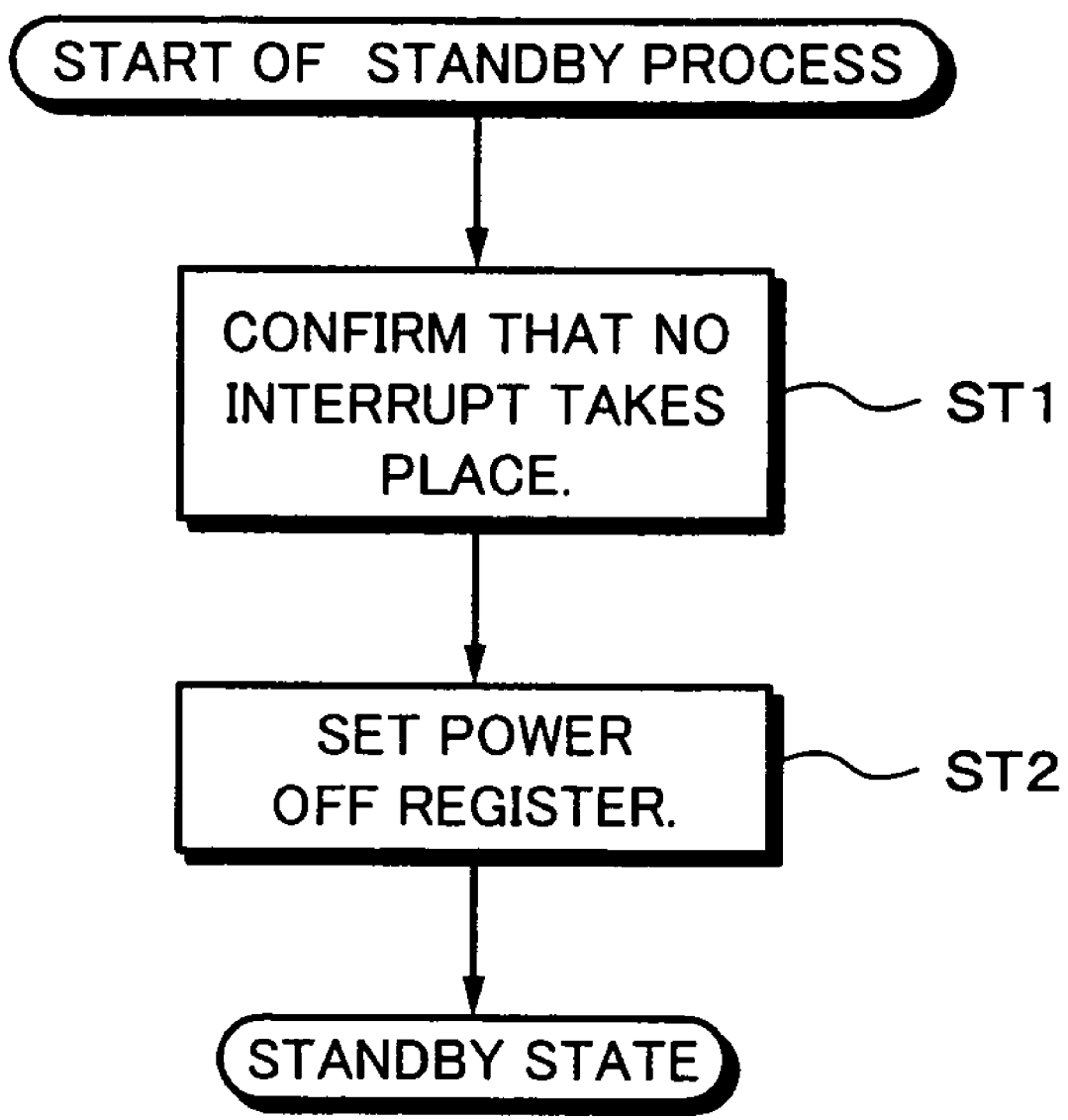
FIG. 4 is a flow chart showing a process performed when the mode changes to the standby mode.

Next, a status changing controlling operation and a power supply controlling operation performed by the CPU 60 will be described. First of all, with reference to a flow chart shown in FIG. 4, an operation for changing the mode of the system LSI 2 from the normal mode to the standby mode will be described.

At step ST1, by reading the contents of a register of the interrupt controlling circuit 70, it is confirmed that no interrupt takes place. When there is no task that the CPU 60 has to process at the point and it was confirmed that no interrupt took place, the flow advances to step ST2. At step ST2, the CPU 60 sets a power off register. As the result, the mode of the system LSI 2 changes to the standby mode.

In the standby mode, the PLL 50 is disabled. When data is not backed up to the eDRAM 23, the clock oscillator 20 is stopped. The power controlling circuit 3 outputs the power IC control signal to the line L4. The power controlling circuit 3 receives the power IC control signal and turns off the power for the main circuit 22. When data is not backed up to the eDRAM 23, the power controlling circuit 3 turns off the power for the eDRAM 23.

Figure 5:
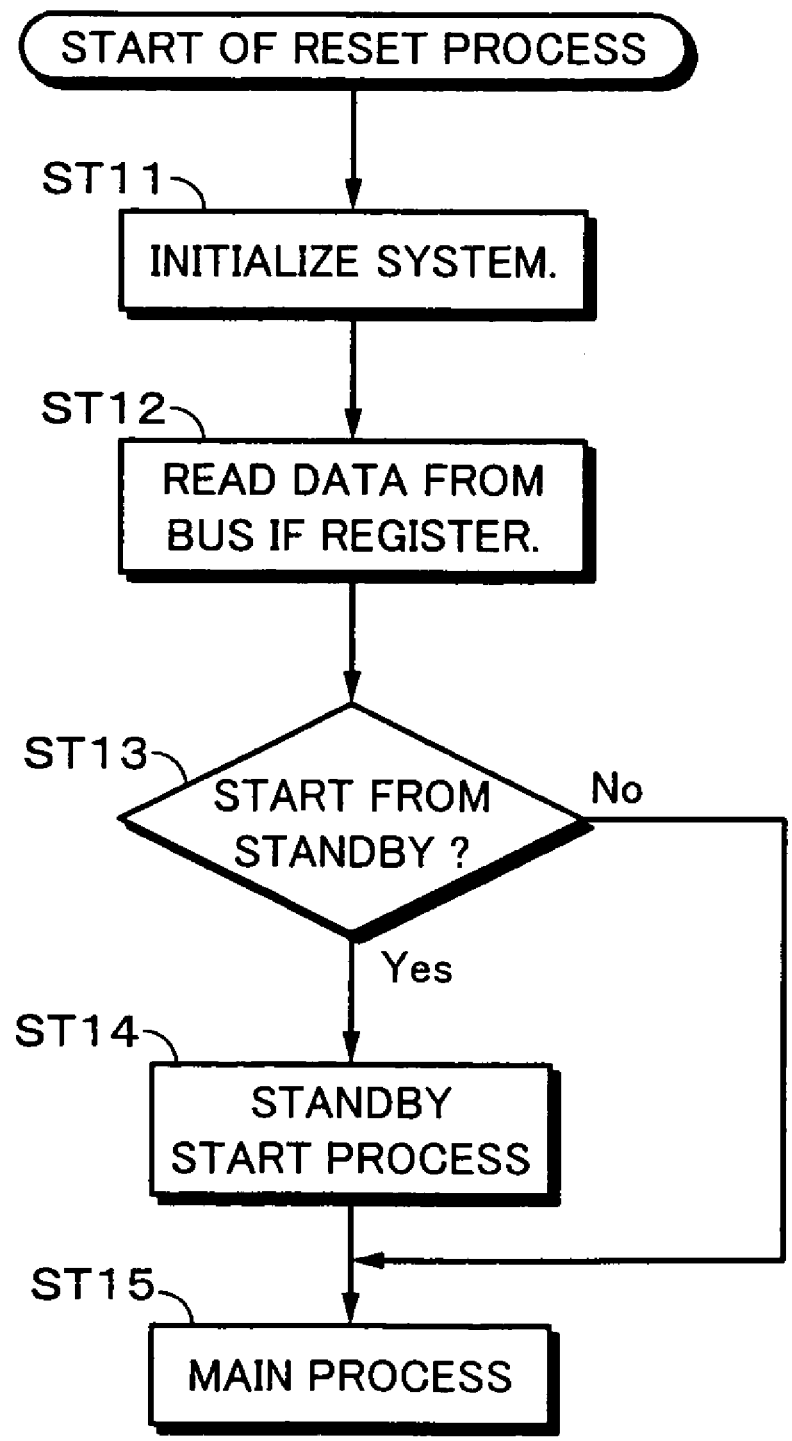
FIG. 5 is a flow chart showing a process performed when the system is woken up from the standby mode.

Next, with reference to the flow chart shown in FIG. 5, an operation for processing a block that has issued a wakeup request in the case that the system LSI 2 is woken up from the standup mode will be described.

When an wakeup request is issued, a reset process is started. At step ST11, the system is initialized. When the wakeup request is supplied to the standby controlling circuit 21, the power IC control signal is supplied to the power controlling circuit 3. As a result, the power for the main circuit 22 and the eDRAM 23 are turned on.

When power is supplied to the main circuit 22, the CPU 60 and the interrupt controlling circuit 70 of the main circuit 22 are reset. When the clock oscillator 20 is stopped, the operation is stared. The PLL 50 is enabled. As a result, the system bus clock s3 is generated. When power and the system bus clock s3 are supplied, the CPU 60 and so forth of the main circuit 22 are operated. As described above, the contents of the shadow register 35 are copied to the bus IF register 31.

At step ST12, the CPU 60 reads data from the bus IF register 31. At step ST13, the CPU 60 determines whether or not the system LSI 2 is woken up from the standby mode. The determination is performed in accordance with the contents of the bus IF register 31. For example, when a new battery 4 is attached after an old battery 4 was detached, the determined result at step ST13 becomes No. At that point, the flow advances to step ST15. Step ST15 is a main process that the battery driven type system 1 performs. The main process includes a key inputting process, an inputting process through the GPIO, and so forth.

At step ST13, when the determined result represents that the system was woken up from the standby mode, the flow advances to step ST14 for a standby startup process. At step ST14, the cause of the wakeup is determined in accordance with the contents of the bus IF register 31. An interrupt signal corresponding to the cause of the wakeup is enabled. Thereafter, the CPU 60 is notified of the interrupt. The interrupt process routine is executed on the program. Thereafter, the main process is performed at step ST15.

Figure 6:
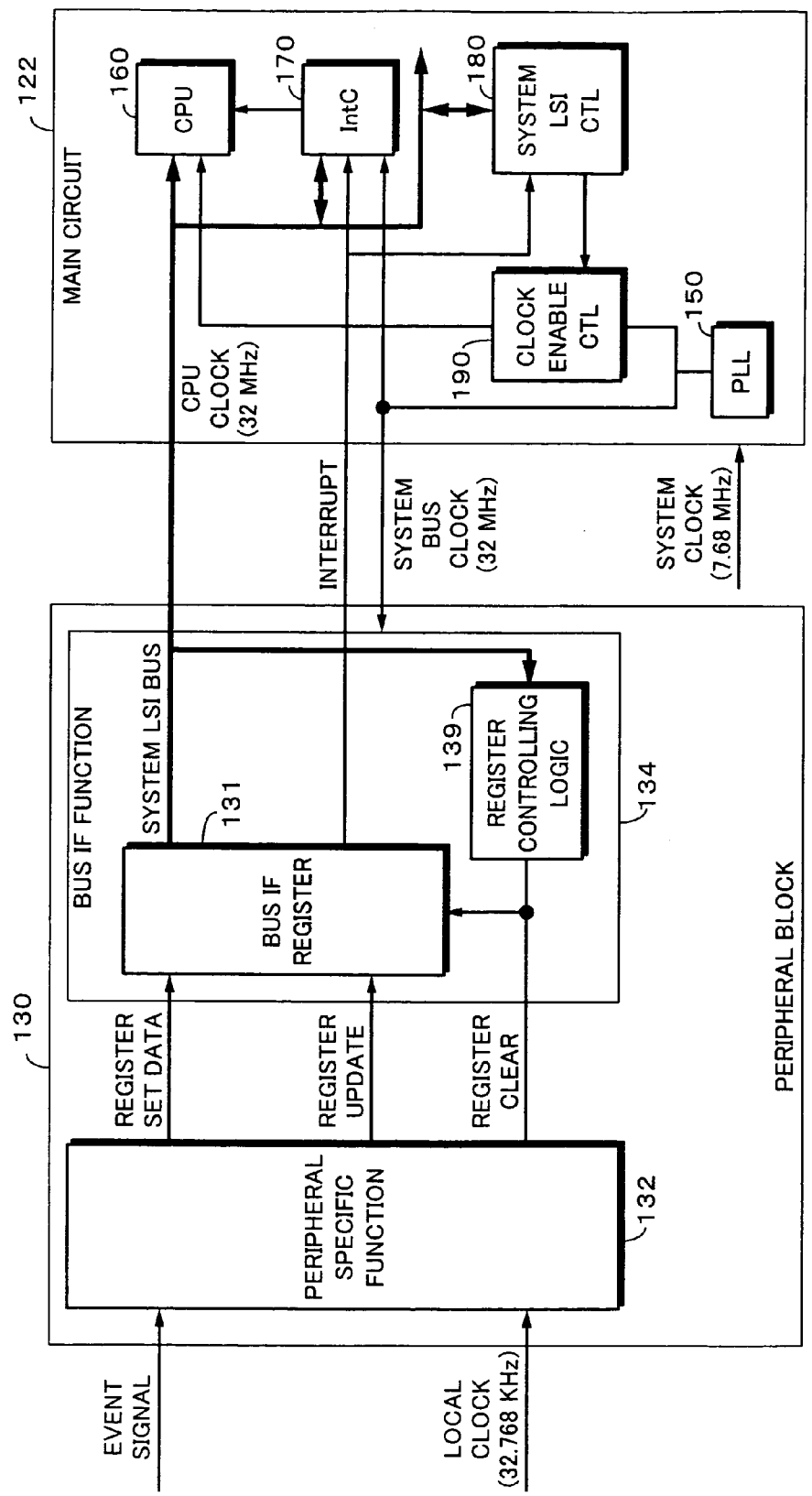
FIG. 6 is a block diagram showing a structure with which the effect of the present invention is described.

FIG. 6 is a block diagram describing the effect of the present invention. In FIG. 6, a peripheral block 130 does not have a shadow register. In the standard mode, while power for the peripheral block 130 is turned on, register set data received from a peripheral specific block 130 is set to a bus IF register 131 at a timing of the register update signal. Like the foregoing embodiment, the bus IF register 131 and a bus IF function 134 having a register controlling block 139 are operated with a system bus clock (32 MHz).

The contents of the bus IF register 131 are read by a CPU 160 of a main circuit 122. The main circuit 122 comprises an interrupt controlling circuit 170, a system LSI controlling block 180, and a clock enable controlling block 190. A system bus clock (of for example 32 MHz) generated by a PLL 150 is supplied to a bus IF function 134 and an interrupt controlling circuit 170. The system bus clock is also supplied to a clock enable controlling block 190. Only in the normal mode, a CPU clock of 32 MHz is supplied to the CPU 160.

As shown in FIG. 6, when a shadow register is not disposed, even in the standby mode, it is necessary to write data to the bus IF register 131. Thus, the system bus clock should be supplied to the bus IF function 134 that has the bus IF register 131. As a result, since the high frequency system bus clock cannot be stopped, the power consumption in the standby mode cannot be reduced. In contrast, according to the present invention, since it is not necessary to supply the clock to the bus IF register 131, the power consumption in the standby mode can be further reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, according to the present invention, a battery is used as a power source. Alternatively, a power source of which a commercial power source is rectified may be used along with a battery.

According to the present invention, the power supply controlling portion causes power for the main circuit, which occupies a large area of an integrated circuit, to be turned off in the standby state, the sub threshold leak current in the standby state can be decreased. Thus, the power consumption in the standby state can be reduced. According to the present invention, when the mode changes from the standby mode to the normal mode, the status stored in the shadow register can be copied to the bus IF register that is operated with the system bus clock. Thus, the clock supplied to the bus IF register can be stopped in the standby mode. In other words, the power consumption in the standby mode can be reduced. In addition, according to the present invention, since the bus IF register is not always operated with the low frequency local clock, the system can be prevented from being operated at low processing speed. In addition, since the operation of which the CPU reads data from a register in the case that the mode changes from the standby mode to the normal mode is the same as that in the normal mode, no difficulty takes place in the operation.

What is claimed is:

1. An electronic apparatus having a semiconductor integrated circuit having a first circuit and a second circuit, the second circuit having a normal operation state and a standby state, the electronic apparatus comprising:

power controlling means for supplying power to the first circuit and the second circuit in the normal operation state and for supplying power to only the first circuit in the standby state;

first and second clock generators disposed in the first circuit and configured to generate first and second clock signals;

a third clock generator disposed in the second circuit and configured to generate a third clock signal;

clock controlling means for controlling a generation of first, second and third clock signals so as to generate the first clock signal, the second clock signal, and the third clock signal in the normal operation state and only the first clock signal in the standby state;

a first register that is disposed in the first circuit and operated with the first clock signal;

a second register that is disposed in the first circuit and operated with the second clock signal; and controlling means for copying contents that are set to the first register to the second register when the state of the second circuit changes from the standby state to the normal operation state, wherein the second clock signal is provided to the first circuit and the second circuit, and the third clock generator generates the third clock signal only when the third clock generator receives the second clock signal.

2. The electronic apparatus as set forth in claim 1, wherein the frequency of the first clock signal is lower than the frequency of the second clock signal.

3. The electronic apparatus as set forth in claim 1, wherein data is set to the second register not through the first region in the normal operation state.

4. The electronic apparatus as set forth in claim 1, wherein the contents of the second register are read by a CPU disposed in the second circuit.

5. The electronic apparatus as set forth in claim 1, wherein information of an event is set from an input device disposed outside the semiconductor integrated circuit to the first register.

6. The electronic apparatus as set forth in claim 1, wherein the power is supplied from a battery.

7. The electronic apparatus as set forth in claim 1, wherein the contents that have been set to the first register are copied to the second register in parallel in one period of the first clock signal.

8. A method for controlling a semiconductor integrated circuit having a first circuit and a second circuit, the second circuit has a normal operation state and a standby state, the method comprising the steps of:

controlling power supplied to the first circuit and the second circuit so as to supply the power to the first circuit and the second circuit in the normal operation state and the power to only the first circuit in the standby state;

controlling generation of a first clock signal, a second clock signal, and a third clock signal so as to generate the first clock signal, the second clock signal, and the third clock signal in the normal operation state and to generate only the first clock signal in the standby state;

generating the third clock signal only when a second clock signal generated by the first circuit is received by the second circuit;

providing the second clock signal to the first circuit and the second circuit; and copying contents that are set in a first register that is disposed in the first circuit and operated with the first clock signal to a second register that is disposed in the first circuit and operated with the second clock signal when the state of the second circuit changes from the standby state to the normal operation state.

* * * * *